(12) United States Patent  
Long

(10) Patent No.: US 8,794,098 B2
(45) Date of Patent: Aug. 5, 2014

(54) PARALLEL ROBOT

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 380 days.

(21) Appl. No.: 13/193,850

(22) Filed: Jul. 29, 2011

(65) Prior Publication Data

US 2012/0103128 A1   May 3, 2012

(30) Foreign Application Priority Data

Oct. 27, 2010   (CN) .......................... 2010 1 0521427

(51) Int. Cl.
 - B25J 17/00 (2006.01)
 - B25J 17/02 (2006.01)
 - B25J 18/00 (2006.01)

(52) U.S. Cl.
 USPC ........................................ 74/490.01; 901/14

(58) Field of Classification Search
 CPC .. F16C 11/0623; F16C 11/06; F16C 11/0647; F16C 11/068; B25J 17/00; B25J 18/00; B25J 17/0266; B25J 17/0283; B25J 19/0016
 USPC ............. 74/490.01, 490.05; 403/76, 90, 122, 403/132, 138, 144; 901/14
 See application file for complete search history.

(56) References Cited

U.S. PATENT DOCUMENTS

| | | | | |
|---|---|---|---|---|
| 986,451 | A * | 3/1911 | Franks | 403/144 |
| 2,451,060 | A * | 10/1948 | Booth | 403/132 |
| 4,426,172 | A * | 1/1984 | Hildebrand | 403/122 |
| 4,938,121 | A * | 7/1990 | Melchior | 92/110 |
| 5,771,747 | A * | 6/1998 | Sheldon | 74/490.01 |
| 6,419,211 | B1 * | 7/2002 | Hvittfeldt et al. | 267/69 |
| 6,439,795 | B1 * | 8/2002 | Lavery et al. | 403/134 |
| 2009/0211390 | A1 * | 8/2009 | Brogardh et al. | 74/490.03 |

FOREIGN PATENT DOCUMENTS

| | | |
|---|---|---|
| CN | 201116524 Y | 9/2008 |
| JP | 2001-90797 A | 4/2001 |
| JP | 2003-148582 A | 5/2003 |
| SU | 1225779 A | 4/1986 |

* cited by examiner

*Primary Examiner* — Justin Krause
(74) *Attorney, Agent, or Firm* — Novak Druce Connolly Bove + Quigg LLP

(57) ABSTRACT

A parallel robot includes a fixed platform, a movable platform, and a plurality of links positioned in parallel between the fixed platform and the movable platform. Each link includes a first connecting member, a second connecting member, a first ball joint, and a second ball joint. The first connecting member connects to the second connecting member with a prismatic joint. The first connecting member connects to the fixed platform via the first ball joint, and the second connecting member connects to the movable platform via the second ball joint. Each of the first and second ball joints includes a ball member, a socket member, and a resilient pressing mechanism. The ball member couples with the socket member. The resilient pressing mechanism is positioned between the ball member and the socket member, applying compression to cause the ball member to tightly contact the socket member.

9 Claims, 5 Drawing Sheets

PARALLEL ROBOT

BACKGROUND

1. Technical Field

The present disclosure relates generally to articulated robots, particularly, to a parallel robot.

2. Description of Related Art

A parallel robot is extensively used in flight simulation and wave simulation. Many parallel robots include a fixed platform, a moveable platform, and six links positioned in parallel between the fixed platform and the moveable platform. The six links can have a fore and aft motion, with each chain including a prismatic joint and two ball joints connected to the fixed platform and the moveable platform respectively. Under a moving synergy of the six links, the moveable platform can be moved in six degrees of freedom relative to the fixed platform.

However, a ball head and a socket are always connected via the ball joint. A space always exists between the ball head and the socket because of insufficient machining and/or assembling precision. The ball head and the socket are easily scoured, and a vibration of the moveable platform occurs. Thus, a movement stability and a location precision of the parallel robot is decreased, making the parallel robot unsuitable for high precision applications.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
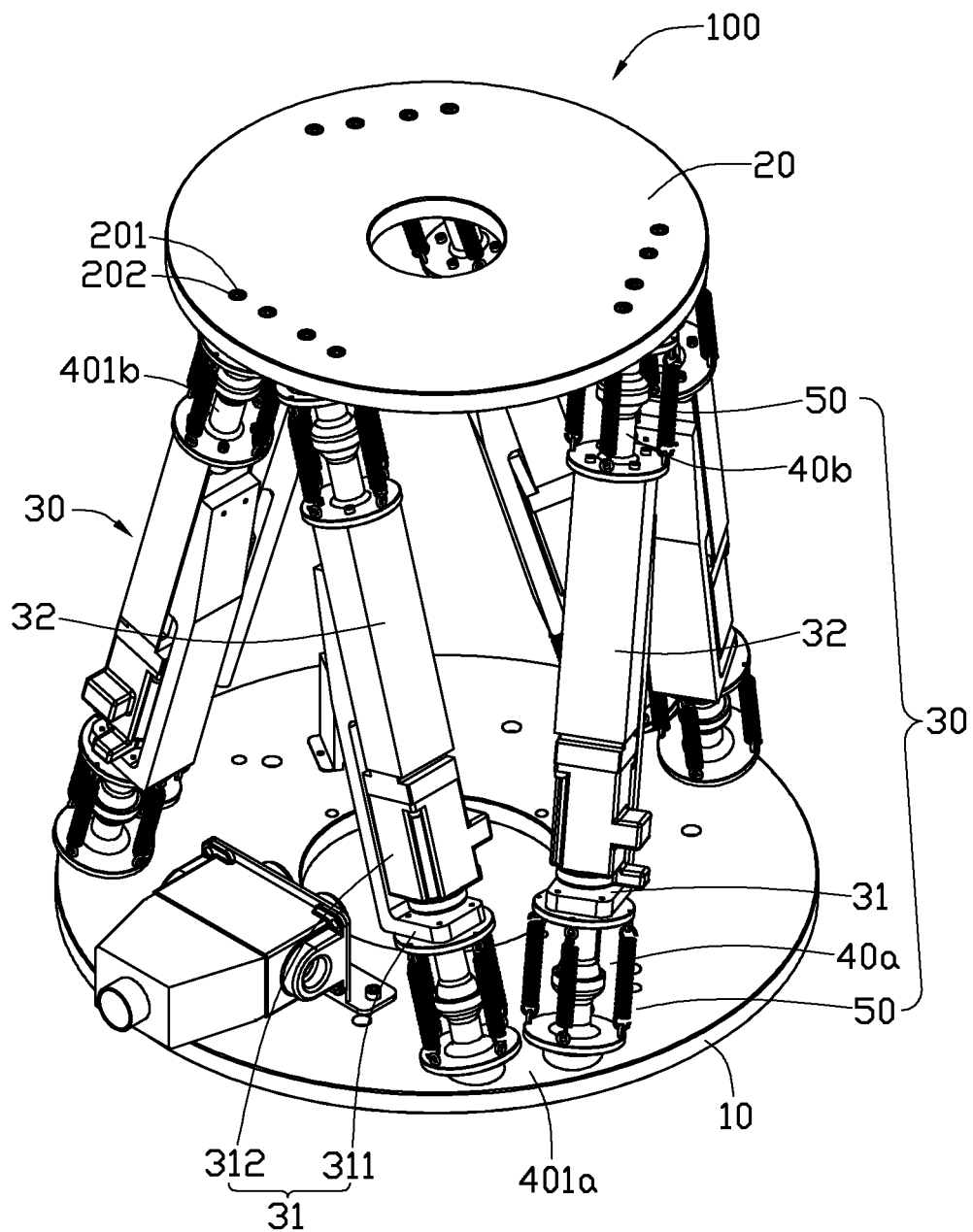
FIG. 1 is an isometric view of one embodiment of a parallel robot including a first ball joint.
Figure 2:
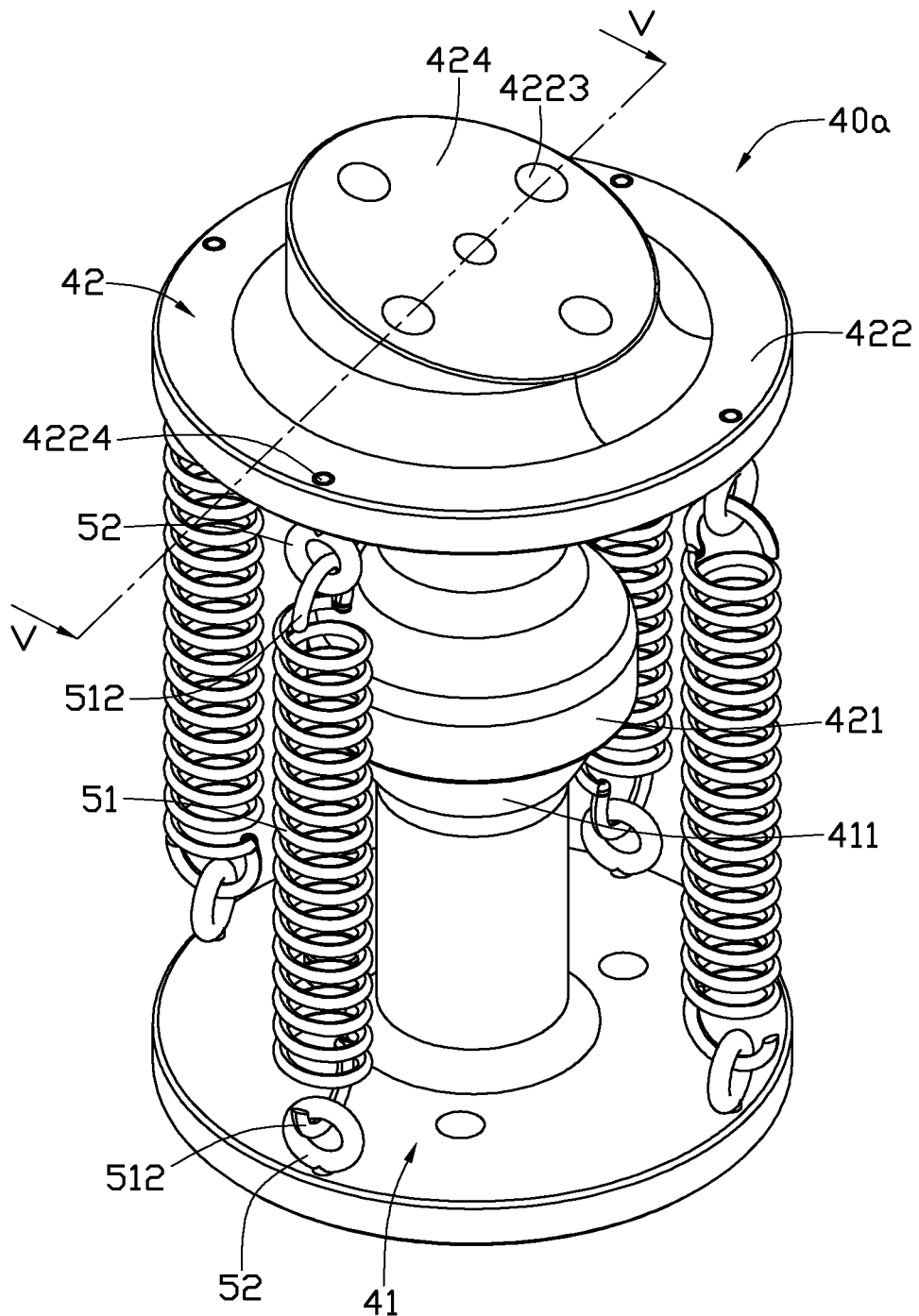
FIG. 2 is an isometric view of the first ball joint of the parallel robot of FIG. 1.
Figure 3:
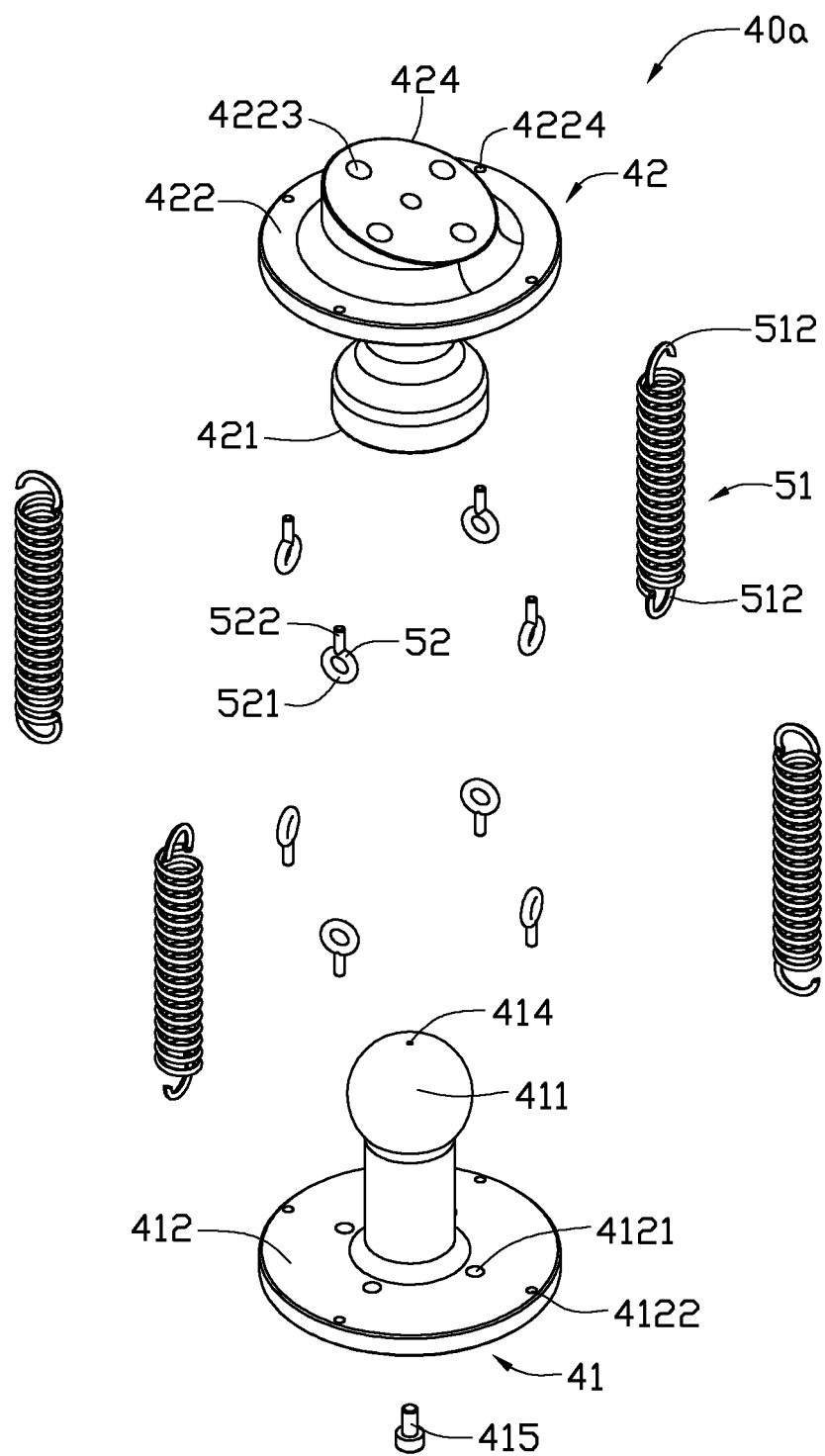
FIG. 3 is an exploded, isometric view of the first ball joint of FIG. 2.
Figure 4:
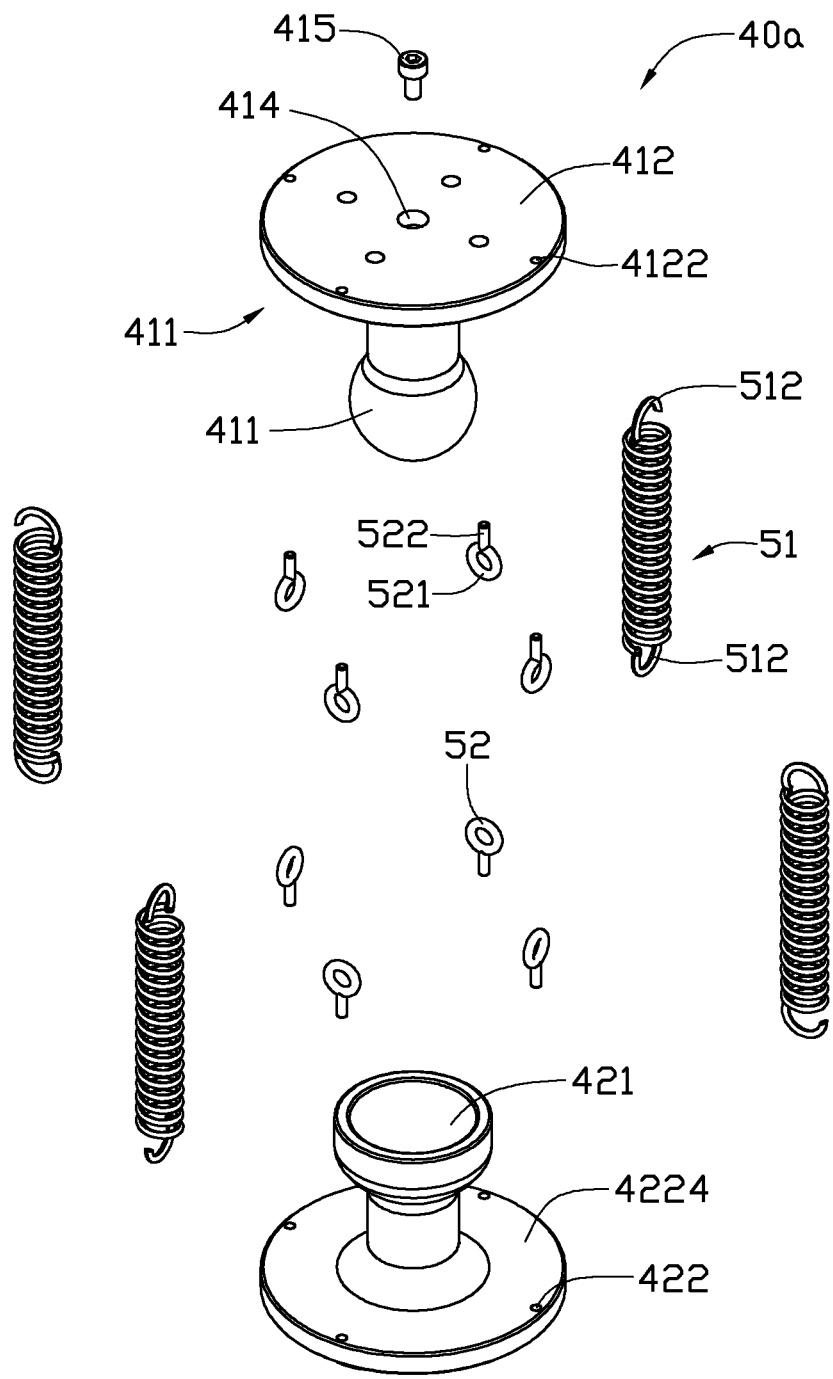
FIG. 4 is similar to FIG. 3, but viewed from another aspect.
Figure 5:
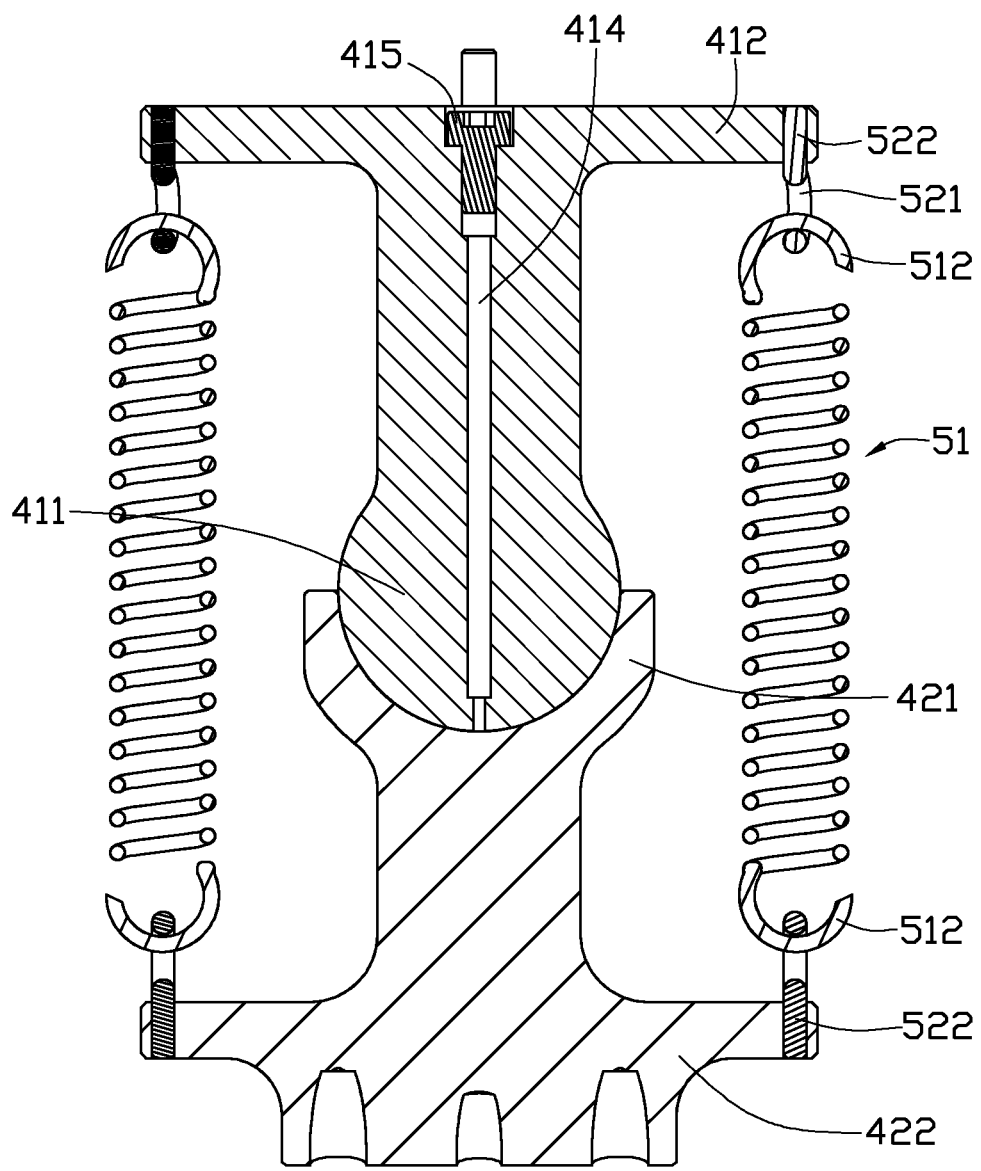
FIG. 5 is a cross-sectional view of the first ball joint of FIG. 2, taken along the line V -V.

Referring to FIGS. 1 and 2, one embodiment of a parallel robot 100 includes a fixed platform 10, a moveable platform 20, and six links 30 positioned in parallel between the fixed platform 10 and the moveable platform 20. Each link 30 includes a first connecting member 31, a second connecting member 32, a first ball joint 40a and a second ball joint 40b. The first connecting member 31 is connected to the second connecting member 32 with a prismatic joint. The first connecting member 31 is connected to the fixed platform 10 via the first ball joint 40a. The second connecting member 32 is connected to the moveable platform 20 via the second ball joint 40b. Each of the first and second ball joints 40a, 40b includes a ball member 41, a socket member 42, and a resilient pressing mechanism 50. The ball member 41 is coupled with the socket member 42. The resilient pressing mechanism 50 is positioned between the ball member 41 and the socket member 42 to apply a compression to tightly match the ball member 41 to the socket member 42.

Referring to FIG. 1 again, both the fixed platform 10 and the moveable platform 20 can be substantially circular, and define a plurality of mounting holes 201 in a periphery of the fixed platform 10 and the moveable platform 20 (mounting holes of the fixed platform 10 are not shown). A plurality of threaded connecting members 202 pass through a plurality of the mounting holes 201 to connect one end of each link 30 to the fixed platform 10 and another end of each link 30 to moveable platform 20.

In the illustrated embodiment, the six links 30 have three positioning relationships as follows:

(1) The six first ball joints 40a connected to the fixed platform 10 are divided into three groups of first ball joints 401a. Each group of the first ball joints 401a includes two first ball joints 40a positioned adjacently, and the three groups of first ball joints 401a are positioned in trisection portions of a circular periphery of the fixed platform 10;

(2) The six second ball joints 40b connected to the moveable platform 20 are divided into three groups of second ball joints 401b. Each group of the second ball joints 401b includes two second ball joints 40b positioned adjacently, the three groups of second ball joints 401b are positioned in trisection portions of a circular periphery of the moveable platform 20;

(3) The three groups of first ball joints 401a and the three groups of second ball joints 401b are positioned in six equal portions of a circular periphery in a stagger manner.

In the illustrated embodiment, the second ball joints 40b are similar to the first ball joints 40a.

Referring to FIGS. 2 to 5, the ball member 41 includes a head 411 and a first flange 412 connected to the head 411. The socket member 42 includes a socket 421 coupled with the head 411, and a second flange 422 connected to the socket 421. The head 411 of the ball member 41 is received in the socket 421 of the socket member 42, and the first flange 412 is positioned opposite to the second flange 422. The resilient pressing mechanism 50 includes a plurality of springs 51 positioned in parallel between the ball member 41 and the socket member 42. Two ends of each spring 51 interconnect the first flange 412 and the second flange 422 respectively, thus the head 411 and the socket 421 can be tightly contacted. In the illustrated embodiment, there are four springs 51, positioned equidistantly circumferentially to provide compression.

The first flange 412 defines a plurality of first installation holes 4121 around a centre of the first flange 412 allowing the threaded connecting members (not shown) to pass through and connect with the first connecting member 31 or the second connecting member 32. An oblique connecting surface 424 is formed on a side of the second flange 422 away from the socket 421. The connecting surface 424 defines a plurality of second installation holes 4223 utilized for allowing threaded connecting members (not shown) to pass through and connect with the fixed platform 10 or the moveable platform 20. The socket member 42 is oblique relative to the fixed platform 10 or the moveable platform 20 after mounting on the fixed platform 10 or the moveable platform 20.

The resilient pressing mechanism 50 further includes a plurality of fixing rings 52 positioned on a periphery portion of the first flange 412 and the second flange 422 which is convenient for mounting and adjusting the springs 51. Each end of each spring 51 forms a hook 512 corresponding to each fixing ring 52. Each fixing ring 52 includes a ring body 521 and a connecting portion 522 formed integrally. The first flange 412 defines a plurality of first fixing holes 4122, and the second flange 422 defines a plurality of second fixing holes 4224 corresponding to the first fixing holes 4122. The connecting portions 522 engage with the first fixing holes 4122 and the second fixing holes 4224 to fix the fixing rings 52 to the first flange 412 and the second flange 422. The hooks 512 can conveniently hang on the fixing rings 52 respectively for mounting or changing the springs 51.

Under a moving synergy of the six links 30, the moveable platform 20 has six degrees of freedom relative to the fixed platform 10. The number of the links 30 may be different according to the desired of freedom of motion for the moveable platform 20. For example, the number of the links 30 may be two to five. The ball member 41 maintains solid contact with the socket member 42 during use depending on the compression applied by the resilient pressing mechanism 50. Even if a space is produced during assembly or abrasion, a space between the ball member 41 and the socket member 42 is diminished or eliminated because of the compression. Thus, movement stability and location precision of the moveable platform 20 are improved.

The ball member 41 can further include an oil hole 414 defined in a longitudinal direction. The oil hole 414 is a through hole with one end of the oil hole 414 extending to a surface of the head 411 matching with the socket 421, and another end of the oil hole 414 extending to the first flange 412, sealed by a sealing member 415 (referring to FIG. 5). The sealing member 415 may be a screw engaged with the ball member 41. Thereby, the ball member 41 can be rotated smoothly relative to the socket member 42 with a lubricant in the oil hole 414.

Referring to FIG. 1 again, the first connecting member 31 can further include a connecting plate 311 connected to the ball member 41, and a driving member 312 positioned on the connecting plate 311. The driving member 312 may drive the second connecting member 32 to move relative to the connecting plate 311. The driving member 312 may be a pneumatic member or a hydraulic member. Under a cooperative constraint of the first ball joints 40a and the second ball joints 40b, the moveable platform 20 may have six degrees of freedom relative to the fixed platform 10, by adjusting a distance of the second connecting member 32 moving relative to the first connecting member 31.

It should be appreciated that the second ball joints 40b may not be similar to the first ball joints 40a, as long as the pre-compression provided by the resilient pressing mechanism 50 can tightly connect the ball member 41 to the socket member 42, and can diminish or eliminate the space produced between the ball member 41 and the socket member 42.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A parallel robot, comprising:
    a fixed platform;
    a moveable platform; and
    a plurality of links positioned in parallel between the fixed platform and the moveable platform, wherein each of the links comprises a first connecting member, a second connecting member, a first ball joint, and a second ball joint; the first connecting member is connected to the second connecting member with a sliding joint, the first connecting member is connected to the fixed platform via the first ball joint, and the second connecting member is connected to the moveable platform via the second ball joint; each of the first and second ball joints comprises a ball member, a socket member, and a resilient pressing mechanism; the ball member is coupled with the socket member, and the resilient pressing mechanism is positioned between the ball member and the socket member to apply compression to cause the ball member to tightly contact the socket member; the resilient pressing mechanism comprises a plurality of springs positioned in parallel between the ball member and the socket member.

2. The parallel robot of claim 1, wherein the ball member comprises a head and a first flange connected to the head; the socket member comprises a socket coupled with the head, and a second flange connected to the socket; the head is received in the socket, the first flange is positioned opposite to the second flange, and two ends of each of the springs interconnect the first flange and the second flange respectively.

3. The parallel robot of claim 2, wherein the resilient pressing mechanism further comprises a plurality of fixing rings positioned on a periphery portion of the first flange and the second flange, and each of the two ends of the spring forms a hook corresponding to each of the fixing rings.

4. The parallel robot of claim 2, wherein the second flange forms an oblique connecting surface on a side away from the socket, the oblique connecting surface connects the first ball joints to the fixed platform and the second ball joints to the moveable platform.

5. The parallel robot of claim 1, wherein the springs are positioned equidistantly circumferentially.

6. The parallel robot of claim 1, wherein the ball member further comprises a oil hole defined in a longitudinal direction; the oil hole is a through hole with one end of the oil hole extending to a surface of the ball member matching with the socket member, and another end of the oil hole sealed by a sealing member.

7. The parallel robot of claim 1, wherein the first connecting member comprises a connecting plate connected to the ball member, and a driving member positioned on the connecting plate; the driving member drives the second connecting member to move relative to the connecting plate.

8. The parallel robot of claim 7, wherein the driving member is a pneumatic member or a hydraulic member.

9. The parallel robot of claim 1, wherein the plurality of links is six links, the six links satisfying three positioning relationships as follows:
    (1) the six first ball joints connected to the fixed platform are divided into three groups of first ball joints, each of the three groups of first ball joints comprises two first ball joints positioned adjacently, and the three groups of first ball joints are positioned in trisection portions of a circular periphery of the fixed platform;
    (2) the six second ball joints connected to the moveable platform are divided into three groups of second ball joints, each of the three groups of second ball joints comprises two second ball joints positioned adjacently, and the three groups of second ball joints are positioned in trisection portions of a circular periphery of the moveable platform; and
    (3) the three groups of first ball joints and the three groups of second ball joints are positioned alternately in six equal portions of a circular periphery.

* * * * *